United States Patent [19]

Bertelli et al.

[11] 4,193,945

[45] Mar. 18, 1980

[54] SELF-EXTINGUISHING POLYMERIC COMPOSITIONS

[75] Inventors: Guido Bertelli; Pierpaolo Roma; Renato Locatelli, all of Ferrara, Italy

[73] Assignee: Montedison S.p.A., Milan, Italy

[21] Appl. No.: 800,569

[22] Filed: May 25, 1977

[30] Foreign Application Priority Data

May 28, 1976 [IT] Italy ................ 23748 A/76

[51] Int. Cl.$^2$ .......................... C08K 3/32; C08K 5/34; C08L 23/16; C08L 77/00
[52] U.S. Cl. .................. 525/2; 260/45.8 N; 260/45.9 NP; 525/6
[58] Field of Search ............. 260/45.8 N, 45.8 NB, 260/45.9 NP, 857 L, 45.8 NT, 45.9 NC, 846, 849, 850, 855, 45.8 NH, 857 D, 880 R, 897 A, 854

[56] References Cited

U.S. PATENT DOCUMENTS

| | | | |
|---|---|---|---|
| 2,700,028 | 1/1955 | Jarboe ................ | 260/45.8 NH |
| 2,727,879 | 12/1955 | Vincent ................ | 260/45.8 NH |
| 2,742,447 | 4/1956 | Fanning et al. ......... | 260/45.8 NH |
| 3,277,045 | 10/1966 | Bonvicini et al. ........ | 260/45.8 NH |
| 3,309,337 | 3/1967 | Hurlock et al. ......... | 260/45.8 NH |
| 3,313,763 | 4/1967 | Creighton et al. ....... | 260/45.8 NB |
| 3,341,491 | 9/1967 | Robinson et al. ........ | 260/45.8 NH |
| 3,370,035 | 2/1968 | Ogura et al. ........... | 260/45.8 NH |
| 3,397,035 | 8/1968 | Yu Shen et al. ......... | 71/34 |
| 3,513,114 | 5/1970 | Hahn et al. ............ | 106/15 FP |
| 3,629,365 | 12/1971 | Gardner ............... | 260/857 PE |
| 3,663,495 | 5/1972 | Michael et al. ......... | 260/45.8 NB |
| 3,663,502 | 5/1972 | Murray et al. ......... | 260/45.9 NP |
| 3,733,289 | 5/1973 | Burns et al. ........... | 260/850 |
| 3,783,146 | 1/1974 | Savides et al. ......... | 260/DIG. 19 |
| 3,810,862 | 5/1974 | Mathis et al. .......... | 260/45.8 NT |
| 3,839,239 | 10/1974 | Godfried .............. | 260/47 EC |
| 3,888,822 | 6/1975 | Gilleo et al. .......... | 260/45.8 N |
| 3,935,162 | 1/1976 | Golborn et al. ......... | 260/45.9 NC |
| 3,943,100 | 3/1976 | Berenbaum et al. ...... | 260/45.8 NT |
| 3,947,276 | 3/1976 | Siclari et al. .......... | 106/168 |
| 3,976,620 | 8/1976 | Golborn et al. ......... | 260/45.9 NC |
| 3,980,616 | 9/1976 | Kimura et al. ......... | 260/45.8 NT |
| 4,026,963 | 5/1977 | Rim et al. ............. | 260/45.8 NB |
| 4,028,378 | 6/1977 | MacFadyen ............ | 260/45.8 NB |
| 4,043,987 | 8/1977 | Jolicoeur et al. ........ | 260/45.8 NT |

OTHER PUBLICATIONS

Lyons, "The Chemistry and Uses of Fire Retardants", 1970, pp. 33-35 and 169.

*Primary Examiner*—Harold D. Anderson
*Assistant Examiner*—R. A. White
*Attorney, Agent, or Firm*—Morgan, Finnegan, Pine, Foley & Lee

[57] ABSTRACT

The present invention relates to self-extinguishing compositions based on olefin polymers or copolymers, such as polypropylene, polyethylene, ethylene-propylene copolymers, EPDM rubbers and other polymers, such as polystyrene, ABS resins, polyethylene terephthalate, polybutylene terephthalate, polycarbonates, and polyamides.

More particularly, the present invention relates to self-extinguishing polymeric compositions comprising, for 100 parts of a polymer as such or containing inert fillers and/or other additives:

(1) 5 to 30 parts of an ammonium phosphate; and
(2) 3 to 20 parts of one or more nitrogen containing compounds selected from a group consisting of (a) those containing the groups $>C=O$ and/or $>C=S$ and $>NH$ inserted in a cyclic structure; (b) those containing the group $-CO-NH-(CH_2)_n-$ in which n is an integer having a value of at least 1, and (c) the reaction products of compounds (a) and/or (b) with aldehydes.

18 Claims, No Drawings

SELF-EXTINGUISHING POLYMERIC COMPOSITIONS

BACKGROUND OF THE INVENTION

Various processes suited to render polymers fireproof are known in the art. Such processes are generally based on the use of metal compounds, particularly of antimony, in combination with heat-unstable halogenated compounds, such as, for example, chlorinated paraffin waxes.

The metal compound + halogenated compound combinations provide satisfactory results as regards the self-extinguishing properties they impart to the polymers, but they exhibit serious drawbacks, namely, corrosion phenomena in the machinery where the materials are processed and a strong evolution of toxic fumes and gases in case of fires. Furthermore, acceptable levels of self-extinguishing power are attained only by employing high concentrations of such combinations.

OBJECTS OF THE INVENTION

An object of the invention is to provide polymeric compositions which have self-extinguishing properties without accompanying drawbacks prevalent with the earlier mentioned prior art self-extinguishing polymeric compositions.

GENERAL DESCRIPTION OF THE INVENTION

It has been now surprisingly found that it is possible to render self-extinguishing thermoplastic polymers of the type indicated above by addition of particular additives that do not cause the drawbacks described hereinbefore.

The compositions according to this invention comprise, for 100 parts of polymer as such or containing inert fillers and/or the additives usually employed in the conventional technique:

(1) 5 to 30 parts of an ammonium phosphate; and (2) 3 to 20 parts of one or more nitrogen containing compounds selected from (a) those containing the groups $>C=O$ and/or $>C=S$ and $>NH$ inserted in a cyclic structure; (b) those containing the group $-CO-NH-(CH_2)_n-$ in which n is an integer having a value of at least 1, and (c) the reaction products of compounds (a) and/or (b) with aldehydes.

Among the various phosphates suited to the purpose, the preferred ones are the ammonium polyphosphates having the general formula $(NH_4)_{n+2} P_n O_{3n+1}$, wherein n is an integer equal to or higher than 2; the molecular weight of the polyphosphates being preferably high enough as to assure a low solubility in water.

Examples of compositions of polyphosphates having the formula indicated above, in which n is a sufficiently great number, are those corresponding to the formula of metaphosphates $(NH_4PO_3)_n$.

A specific example of such polyphosphates is that known under the trade name "Albaplas AP 95" (produced and sold by Benckiser Knapsack GmbH), having the composition $(NH_4PO_3)_n$, wherein n is higher than 50; another example is the product known under the trademark Phos-Chek P/30 (Monsanto Chemical Co.) and having a similar composition.

Some representative examples of the compounds of group (2) are: ethylene-urea, ethylene-thiourea, hydantoin, hexahydropyrimidine-2-one, piperazine-3,6-dione, barbituric acid, uric acid, indigotin, Nylon 6 which is a polyamide from epsilon-caprolactam and Nylon 66 which is a polyamide from hexamethylenediamine and adipic acid.

The compounds of group (2) are preferably employed in the form of reaction products with an aldehyde, in particular with formaldehyde.

Such reaction products offer the advantage of being free from bad smells, as well as insoluble and more compatible with the polymers which they are added to. They are prepared by known methods.

Thus, for instance, to prepare the ethylene-thiourea/$CH_2O$ reaction product, ethylene-thiourea is dissolved in water in an amount of 50 g/liter, it is acidified up to a pH value of 2 by admixing a dilute acid (for example sulphuric or phosphoric acid), it is heated to 90° C. and an aqueous solution of formaldehyde at 37% by weight is dropped ito the ethylene-thiourea solution, kept at 90° C. and under intense stirring, until attaining a $CH_2O$/ethylene-thiourea molar ratio equal to 2. The resulting precipitate, in the form of a very fine powder, is filtered, washed with water and dried.

To prepare the hexahydropyrimidine-2-one/$CH_2O$ reaction product, hexahydropyrimidine-2-one and an aqueous solution offormaldehyde at 37% by weight are introduced into the flask of a rotary evaporator in such ratios, as to have a molar ratio $CH_2O$/hexahydropyrimidine-2-one equal to 2, it is acidified as indicated hereinabove up to a pH=2 and it is heated in an oil bath kept at 120° C. until thorough evaporation of the water present at a pressure lower than the atmospheric pressure and in a nitrogen flow. Successively, the bath temperature is raised to 180° C. until thorough removal of the reaction water, the obtained dry product is ground to a fine-grain powder and is washed with water until disappearance of acidity.

The compositions according to the present invention can be prepared according to conventional methods. For example, the polymer and the flame-proof additives are mixed in a blade mixer of the Banbury type at the polymer plasticizing temperature. The resulting mix is then extruded in a DOLCI type extruder (screw diameter=20 mm; screw length/diameter ratio=23; screw speed =20 r.p.m.) at the temperature best suited to obtain a granulated product, such temperature varying as a function of the polymer.

To determine the self-extiguishing properties of the polymeric compositions which are the object of the invention, the following procedure is used:

The granular product is molded to sheets of 3 mm thickness by means of a small press of the CARVER type, working for 7 minutes at a pressure of 40 kg/cm$^2$ and at a suitable temperature, that may vary from polymer to polymer.

The level of the self-extinguishing power is determined on the sheets so prepared either by measuring (according to standard ASTM D-2863) the oxygen index, that expresses the minimum percentage of $O_2$ in a $O_2/N_2$ mixture required by the sample to burn continuously, or by applying standards UL-94 (published by the "Underwriters Laboratories" - USA), that provide an evaluation of the self-extinguishing degree of plastic materials.

Standards UL-94 provide for different, more or less severe test conditions and permit to classify the sample at different self-extinguishing levels.

In the tests reported on Tables I and II, the Vertical Burning Test has been adopted, which permits to classify the material at the decreasing levels 94V-O, 94V-1 and 94V-2.

East test is conducted on a group of 5 specimens that may have a thickness of ¼", ⅛" or 1/16".

The specimen, kept in a vertical position by means of a suitable stand, is primed with a flame at its lower end, and two ignition attempts are effected (at the two ends of the specimen), each attempt lasting 10 seconds.

The three above-mentioned self-extinguishing levels may be briefly defined as follows:

94V-O — No specimen burns for more than 10 seconds after each application of the flame or drops burning particles. Moreover, the total combustion time does not exceed 50 seconds for the 10 attempts made on the 5-specimen group.

94V-1 — Combustion times up to 30 seconds for an individual specimen and up to 250 seconds for the 10 attempts made on the 5-specimen group are allowable. Also at this level no specimen drops burning particles.

94V-2 — The allowable combustion times are the same as for level 94V-1, but the fall of burning particles is allowed.

SPECIFIC DESCRIPTION OF THE INVENTION

The two following Tables show the results achieved in the tests carried out with polypropylene, polyethylene, polystyrene, an ABS resin, a polyamide and a blend polypropylene/EPDM rubber.

Table I

Self-extinguishing compositions based on polypropylene

| Ingredients | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 13 | Ex. 14 | Ex. 15 |
|---|---|---|---|---|---|---|---|---|---|---|---|---|---|---|---|
| Polypropylene | 75 | 75 | 75 | 80 | 70 | 70 | 75 | 80 | 75 | 70 | 75 | 73 | 73 | 75 | 70 |
| Albaplas AP 95 (ammonium polyphosphate) | 17 | 17 | 17 | 17 | 15 | 15 | 17 | 15 | 15 | 18 | 17 | 17 | 20 | 17 | 15 |
| Hexahydropyrimidine-2-one | 8 | — | — | — | — | — | — | — | — | — | — | — | — | — | — |
| Hydantoin | — | 8 | — | — | — | — | — | — | — | — | — | — | — | — | — |
| Hexahydropyrimidine-2-one/formaldehyde | — | — | 8 | 3 | — | — | — | — | — | — | — | — | — | — | — |
| Nylon 6, ground | — | — | — | — | 15 | — | — | — | — | — | — | — | — | — | 10 |
| Nylon 66, ground | — | — | — | — | — | 15 | — | — | — | — | — | — | — | — | — |
| Ethylene-thiourea/formaldehyde | — | — | — | — | — | — | 8 | 5 | — | — | — | — | — | — | — |
| Ethylene-thiourea | — | — | — | — | — | — | — | — | 10 | 12 | — | — | — | — | — |
| Ethyleneurea/formaldehyde | — | — | — | — | — | — | — | — | — | — | 8 | 10 | 7 | 8 | 5 |
| Oxygen Index | 28 | 27 | 32.5 | 29.5 | 27 | 27 | 32 | 28.5 | 28 | 31 | 32.5 | 33.5 | 30.5 | 33.5 | 35 |
| UL-94 (⅛") | — | — | — | — | — | — | V-0 | V-0 | V-0 | V-0 | V-0 | V-0 | V-0 | V-0 | V-0 |

Table II

Self-extinguishing compositions based on polyethylene or polystyrene or ABS resin or polyamide or blend polypropylene/EPDM rubber

| Ingredients | Ex. 16 | Ex. 17 | Ex. 18 | Ex. 19 | Ex. 20 | Ex. 21 | Ex. 22 | Ex. 23 |
|---|---|---|---|---|---|---|---|---|
| Polyethylene | 65 | — | — | — | 75 | — | — | — |
| Polystyrene | — | 65 | — | — | — | — | — | 75 |
| ABS resin | — | — | 65 | — | — | — | 75 | — |
| Polyamide from caprolactam | — | — | — | 80 | — | — | — | — |
| Blend polypropylene/EPDM rubber | — | — | — | — | — | 75 | — | — |
| Albaplas AP 95 (ammonium polyphosphate) | 20 | 20 | 20 | 15 | 17 | 17 | 17 | 17 |
| Ethylene-thiourea | 15 | 15 | 15 | — | — | — | — | — |
| Hexahydropyrimidine-2-one/formaldehyde | — | — | — | 5 | — | — | — | — |
| Ethyleneurea/formaldehyde | — | — | — | — | 8 | 8 | 8 | 8 |
| Oxygen Index | 28 | 27 | 28.5 | 27.5 | 27.5 | 26.5 | 28.5 | 32 |
| UL-94 (⅛") | V-0 | V-0 | V-0 | V-0 | V-0 | V-0 | V-0 | V0 |

What is claimed is:

1. Self-extinguishing polymeric compositions comprising a polymer selected from the group consisting of polypropylene, polyethylene, polystyrene, acrylonitrile-butadiene-styrene resins and blends of polypropylene and EPDM rubber, and a combination of
   (1) from 5 to 30 parts by weight, based on 100 parts of the total composition, of an ammonium phosphate or ammonium polyphosphate; and
   (2) from 3 to 20 parts by weight, based o 100 parts of the total composition, of one or more nitrogen containing compounds selected from the group consisting of (a) those containing $>C=O$ and/or $>C=S$ and $>NH$ inserted in a cyclic structure; (b) polyamides, and (c) water insoluble reaction products of compound (a) with an aliphatic aldehyde.

2. Polymeric compositions according to claim 1, in which a polyphosphate having the composition $(NH_4PO_3)_n$, wherein n is higher than 50, is employed as the ammonium polyphosphate.

3. Polymeric compositions according to claim 1, in which ethylene-thiourea is used as a nitrogen containing compound.

4. Polymeric compositions according to claim 1, in which hexahydropyrimidine-2-one is used as a nitrogen containing compound.

5. Polymeric compositions according to claim 1, in which hydantoin is used as a nitrogen containing compound.

6. Polymeric compositions according to claim 1, in which a polyamide from epsilon-caprolactam is used as a nitrogen containing compound.

7. Polymeric compositions according to claim 1, in which a polyamide from hexamethylenediamine and adipic acid is employed as a nitrogen containing compound.

8. Polymeric compositions according to claim 1, in which a water insoluble reaction product ethylenethiourea/formaldehyde is employed as a nitrogen containing compound.

9. Polymeric compositions according to claim 1, in which a water insoluble reaction product ethyleneurea/formaldehyde is employed as a nitrogen containing compound.

10. Polymeric compositions according to claim 1, in which a water insoluble reaction product hexahydropyrimidine-2-one/formaldehyde is used as a nitrogen containing compound.

11. Polymeric compositions according to claim 1, in which the polymer is polypropylene.

12. Polymeric compositions according to claim 1, in which the polymer is polyethylene.

13. Polymeric compositions according to claim 1, in which the polymer is polystyrene.

14. Polymeric compositions according to claim 1, in which the polymer is a resin of the ABS type.

15. Polymeric compositions according to claim 1, in which the polymer is a blend polypropylene/EPDM rubber.

16. Self-extiguishing polymeric compositions comprising a polymer selected from among polypropylene, polyethylene, polystyrene, acrylonitrile-butadiene-styrene resins and blends of polypropylene and EPDM rubber, and
  (1) from 5 to 30 parts by weight, based on 100 parts of the total composition, of an ammonium phosphate or ammonium polyphosphate; and
  (2) from 3 to 20 parts by weight, based on 100 parts of the total composition, of a nitrogen containing compound selected from among ethylenethiourea, hexahydropyrimidine-2-one, hydantoin, a water insoluble reaction product of any of the foregoing with an aliphatic aldehyde, and a polyamide from hexamethylenediamine and adipic acid.

17. Self-extinguishing polymeric compositions comprising a polymer selected from the group consisting of polypropylene, polyethylene, polystyrene, acrylonitrile-butadienestyrene resins and blends of polypropylene and EPDM rubber, and a combination of
  (1) from 5 to 30 parts by weight, based on 100 parts by weight of the total composition, of an ammonium phosphate or ammonium polyphosphate; and
  (2) from 3 to 20 parts by weight, based on 100 parts of the total composition, of ethylenethiourea or a water insoluble reaction product of said ethylenethiourea with an aliphatic aldehyde.

18. Self-extinguishing polymeric compositions comprising a polymer selected from the group consisting of polypropylene, polyethylene, polystyrene, acrylonitrile-butadienestyrene resins and blends of polypropylene and EPDM rubber, and a combination of
  (1) from 5 to 30 parts by weight, based on 100 parts by weight of the total composition, of an ammonium phosphate or ammonium polyphosphate; and
  (2) from 3 to 20 parts by weight, based on 100 parts of the total composition, of hexahydro-pyrimidine-2-one or a water insoluble reaction product of hexahydropyrimidine-2-one with an aliphatic aldehyde.

* * * * *